United States Patent [19]

Sandell et al.

[11] Patent Number: 5,570,341
[45] Date of Patent: Oct. 29, 1996

[54] METHOD OF ASSEMBLING DISK CARTRIDGE WITH ONE-PIECE PLASTIC MOLDED DOOR

[75] Inventors: Patrick Sandell, Barrington; Mohamed Agha, Hoffman Estates, both of Ill.

[73] Assignee: Opticord, Inc., Palatine, Ill.

[21] Appl. No.: 263,055

[22] Filed: Jun. 21, 1994

[51] Int. Cl.⁶ ..................................................... G11B 23/02
[52] U.S. Cl. .............................................................. 369/291
[58] Field of Search .............................. 369/291; 360/133

[56] References Cited

U.S. PATENT DOCUMENTS

| | | | |
|---|---|---|---|
| 4,698,714 | 10/1987 | Sugawara et al. | 360/133 |
| 4,908,817 | 3/1990 | Sandell et al. | 360/133 |
| 4,945,530 | 7/1990 | Sandell et al. | 360/133 |
| 4,994,930 | 2/1991 | Uehara | 360/133 |
| 5,325,257 | 6/1994 | Akiyama et al. | 360/133 |

*Primary Examiner*—Robert S. Tupper
*Assistant Examiner*—George J. Letscher
*Attorney, Agent, or Firm*—Leydig, Voit & Mayer, Ltd.

[57] ABSTRACT

A rewritable optical disk is protectively enclosed in a cartridge formed in part by two plastic shells disposed in face-to-face relation and defining a compartment for the disk. A door with shutters is slidable on the shells between open and closed positions relative to access apertures formed in the shells. The shutters are molded integrally with a connecting web to enable the door to be manufactured as a single-piece unit. A tongue molded integrally with the web enables the door to be assembled to the shells with a slip-in fit and coacts with the shells to mount the door for sliding between its open and closed positions.

1 Claim, 2 Drawing Sheets

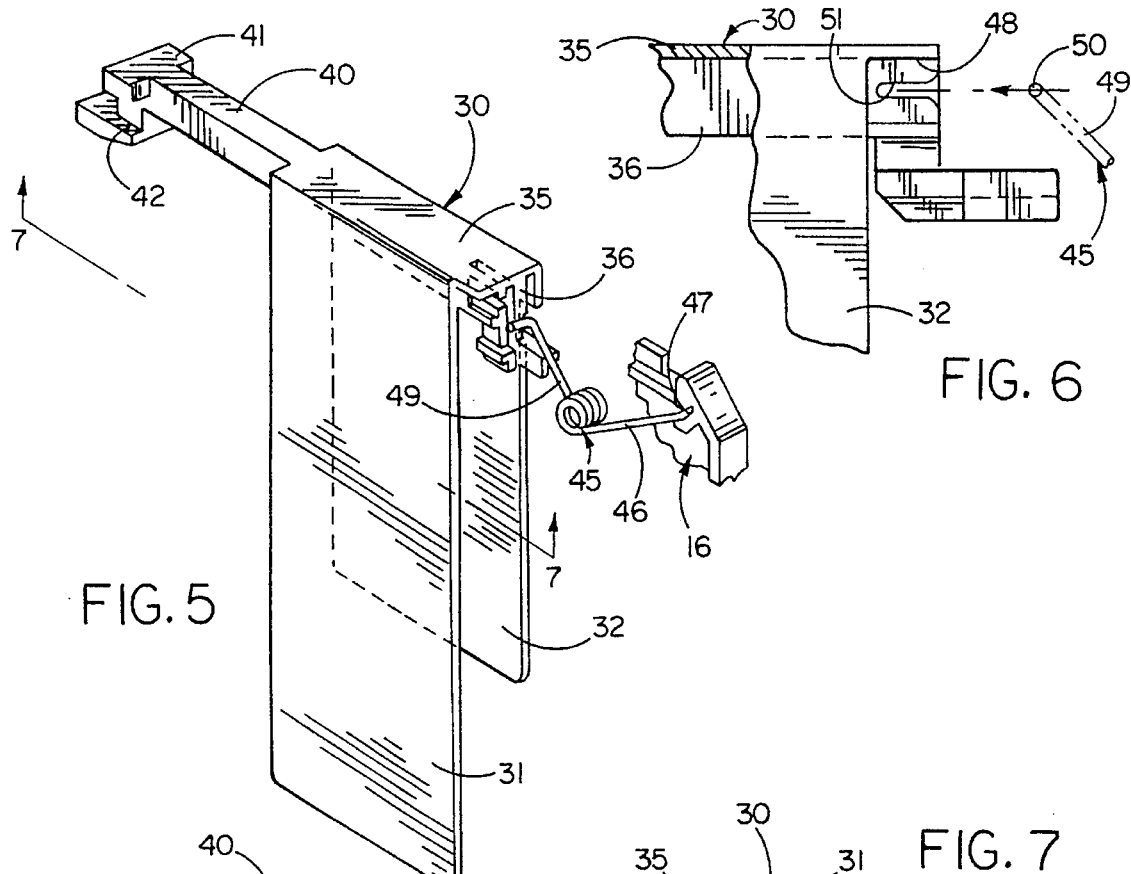
FIG. 5
FIG. 6
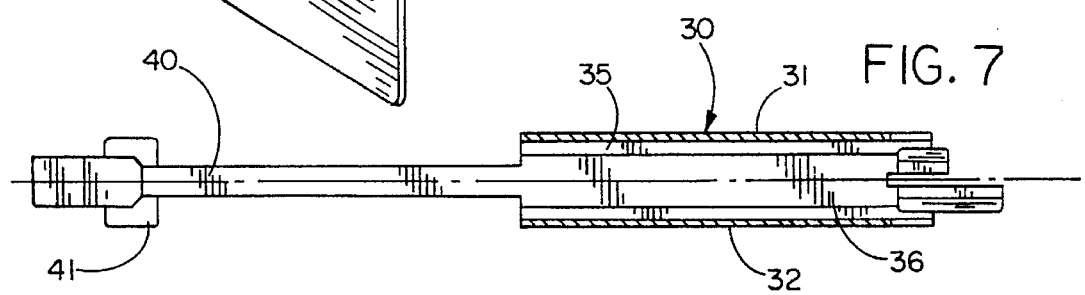
FIG. 7
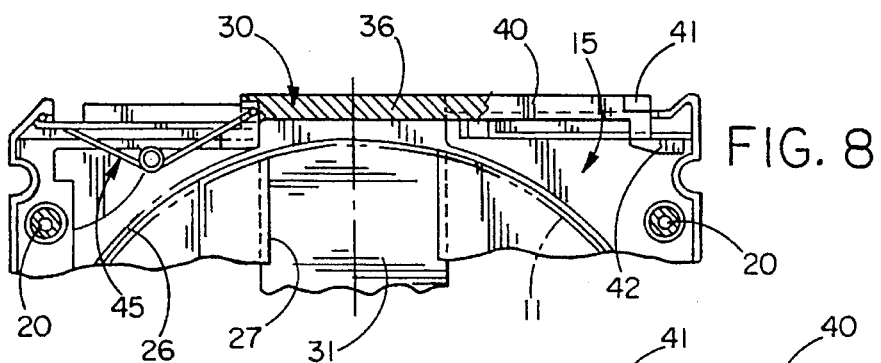
FIG. 8
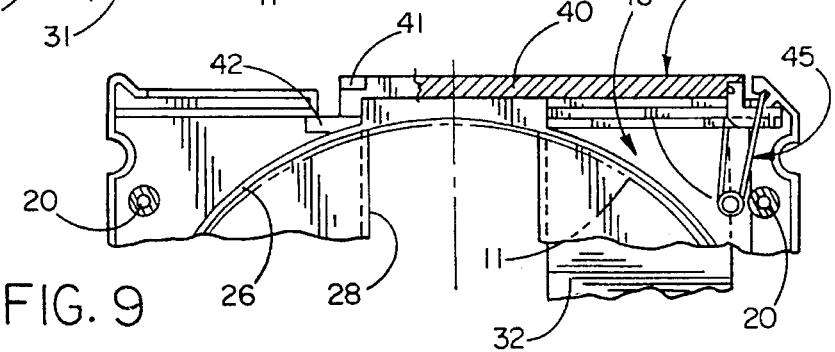
FIG. 9

METHOD OF ASSEMBLING DISK CARTRIDGE WITH ONE-PIECE PLASTIC MOLDED DOOR

BACKGROUND OF THE INVENTION

The present invention relates generally to cartridges for data information disks. The invention relates more particularly to cartridges for protecting rewritable optical disks used for mass storage of alphanumeric data which may be accessed by a computer. Such a disk is preferably enclosed within a cartridge to prevent the disk from being scratched or nicked during handling. In use, the cartridge containing the disk is inserted into a disk drive having an optical reader/writer and thereafter a sliding door on the cartridge is opened to expose portions of the disk to the reader/writer.

A cartridge of this general type is disclosed in Sandell et al U.S. Pat. No. 4,908,817. The cartridge of that patent comprises a pair of face-to-face shells which define a compartment containing the disk. The sliding door is generally U-shaped and is formed in part by a pair of shutters which normally close access apertures formed in opposite sides of the cartridge. When the door is slid open, the shutters open the access apertures. Upon opening of the apertures, one side of the disk is exposed to a rotary drive spindle of the disk drive and to a laser for reading and writing data on the disk. The other side of the disk is exposed to a magnetic head for erasing data from the disk.

In the cartridge of the '817 patent, the shells are made of plastic and, in one embodiment, the door also is made of plastic. The shutters of the door are separately molded and ultimately are joined to one another by a press fit. The cartridge manufacturer attaches one shutter to one shell, attaches the other shutter to the other shell, partially assembles the shells with one another and ships the cartridge to the disk manufacturer. The latter inserts the disk between the shells and completes the assembly of the shells.

SUMMARY OF THE INVENTION

The general aim of the present invention is to provide a protective cartridge having a new and improved door which may be more economically manufactured and more easily assembled with the shells than has been possible heretofore.

A more detailed object of the invention is to achieve the foregoing by providing a cartridge having a single-piece door with shutters which are molded integrally with one another so as to avoid the cost of manufacturing two separate shutters and assembling the shutters with one another.

A related object is to provide a cartridge with a single-piece door which may be shipped to the disk manufacturer separately of the shells and which may be quickly assembled with the shells after the disk has been placed between the shells and the shells have been fully assembled with one another.

The invention also resides in the novel method of assembling the disk, the shells and the door.

These and other objects and advantages of the invention will become more apparent from the following detailed description when taken in conjunction with the accompanying drawings.

BRIEF DESCRIPTION OF THE DRAWINGS

FIG. 5 is a perspective view showing the door and a portion of one of the shells.

FIG. 6 is an enlarged elevational view of a portion of the door.

FIG. 7 is an enlarged cross-section taken substantially along the line 7—7 of FIG. 5.

FIG. 8 is an enlarged fragmentary cross-section taken substantially along the line 8—8 of FIG. 1.

FIG. 9 is an enlarged fragmentary cross-section taken substantially along the line 9—9 of FIG. 2.

Figure 1:
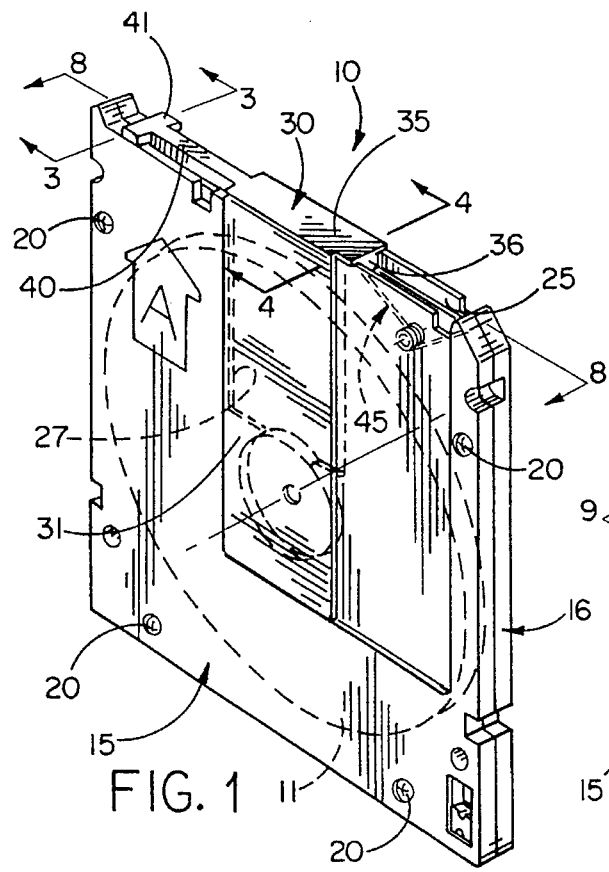
FIG. 1 is a perspective view of one side of a new and improved data disk cartridge incorporating the unique features of the present invention and shows the door of the cartridge in a closed position.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the invention has been shown in the drawings as embodied in a protective cartridge 10 for a rewritable optical disk 11. In some respects, the cartridge is similar to those of Sandell U.S. Pat. No. 4,908,817, the disclosure of which is incorporated herein by reference, and is particularly similar to the cartridge shown in FIGS. 16-19 of that patent.

The cartridge 10 is especially adapted for use with a disk 11 having alphanumeric data recorded on one side thereof, the data herein being on the side of the disk located adjacent the side "A" of the cartridge. Such a disk is considered defective if any portion of the data encoded thereon cannot be faithfully reproduced. Accordingly, it has been recognized that for storing alphanumeric data on optical disks, the disk should be contained within a protective cartridge to prevent the disk from become scratched or pitted during handling. Due to the relative difficulty of manufacturing the disk, especially if the information content is incorporated into the disk as made, it is advantageous to ship the cartridge 10 to the location where the disk is manufactured and to assemble the disk with the cartridge at that location. This avoids the need for shipping the disk without the disk being enclosed in the protective cartridge, which would require additional packaging and careful wrapping and unwrapping of the disk.

Figure 3:
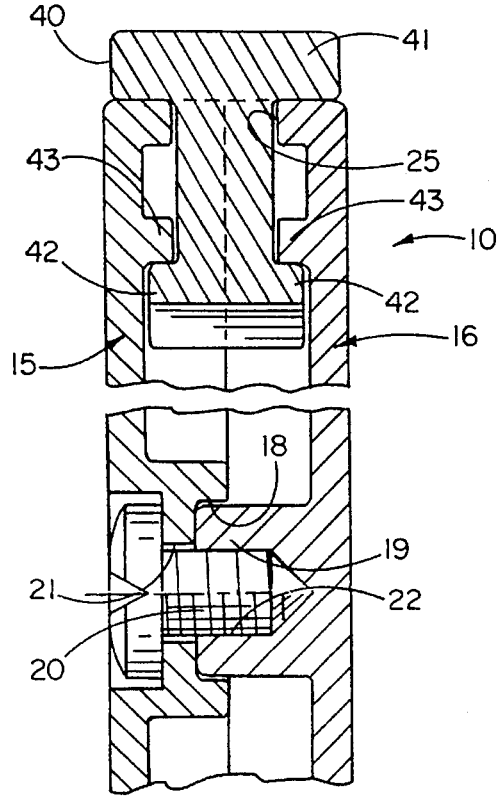
FIGS. 3 and 4 are enlarged fragmentary cross-sections taken substantially along the lines 3—3 and 4—4, respectively, of FIG. 1.
Figure 4:
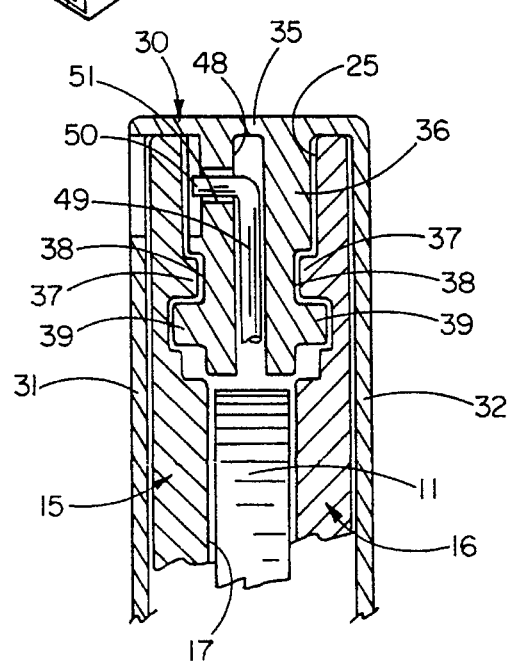

The present cartridge 20 comprises a pair of face-to-face shells 15 and 16 which define a compartment 17 (FIG. 4) for the disk 11. Preferably, the shells are molded from a resiliently flexible plastic resin such as polycarbonate. The inner side of the shell 15 is formed with circular pockets 18 (FIG. 3) adapted to telescopically receive bosses 19 formed integrally with the inner side of the shell 16. Screws 20 extend through holes 21 in the shell 15 and are threaded into holes 22 in the shell 16 to join the shells together adjacent the four corners of the cartridge. When the shells are so joined, the peripheral edges of the shell 15 abut the peripheral edges of the shell 16 along three sides of the cartridge 10 and close off the compartment 17. Along the top of the cartridge, the peripheral edge of the shell 15 is spaced from that of the shell 16 such that a channel 25 is defined between the two shells.

The inner side of each shell 15, 16 is formed with a generally circular rib 26 (FIGS. 8 and 9). When the shells are joined together, the two ribs coact to define a pocket for the disk 11.

Figure 2:
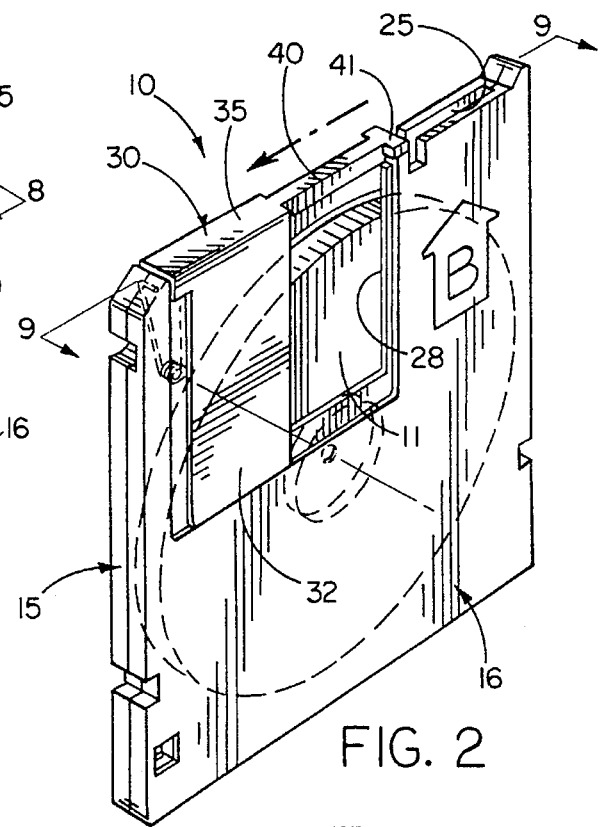
FIG. 2 is a perspective view of the other side of the cartridge illustrated in FIG. 1 and shows the door in an open position.

A generally rectangular access aperture 27 (FIGS. 1 and 8) is formed through the shell 15 and extends downwardly from a location closely adjacent the top of the shell to a location somewhat beyond the center of the shell. The access aperture is adapted to be selectively opened and closed and, when open, exposes the adjacent side of the disk 11 to a rotary disk drive and to a laser head for recording data on and reading data from the disk. A generally similar access aperture 28 (FIGS. 2 and 9) is formed through the shell 16 in order to enable the disk to be exposed to a magnetic head for erasing data from the disk. The access aperture 28 extends downwardly from a location adjacent the top of the shell 16 to a location somewhat short of the center of the shell.

The access apertures 27 and 28 are adapted to be selectively opened and closed by a slidable door 30 having shutters 31 and 32 which, when the door is closed, cover the apertures 27 and 28, respectively. The door normally is disposed in its closed position (FIGS. 1 and 8) and thus the shutters protect the disk 11 against contamination which might otherwise enter the access apertures. When the cartridge 10 is inserted into the disk drive, a pivoted actuator arm (not shown) slides the door to its open position (FIGS. 2 and 9) so that the shutters expose the access apertures and the disk.

In accordance with the present invention, the shutters 31 and 32 are molded integrally with one another so that the door 30 is a single-piece unit. As a result, there is no need of individually molding two separate shutters and then assembling such shutters to one another. The cost of the cartridge 10 thus is reduced.

More specifically, the door 30 preferably is injection molded from a plastic resin having low friction properties such as acetal GB. Each shutter 31, 32 is generally flat and rectangular and is appropriately sized to cover its associated access aperture 27, 28.

In carrying out the invention, the shutters 31 and 32 are molded integrally with means in the form of a web 35 which serves to join the shutters to one another. Herein, the web 35 is simply a flat member having a width just slightly greater than the spacing between the outer sides of the shells 15 and 16 so that the web may be located on the top of the shells with the shutters straddling the outer sides of the shells. By virtue of the web 35, the door 30 is generally U-shaped in cross-section.

Further in keeping with the invention, the single-piece door 30 is adapted to be assembled with the shells 15 and 16 with a slip-in, interference fit. For this purpose, a tongue 36 (FIG. 4) is molded integrally with and depends from the underside of the web 35 and is adapted to project into the channel 25 defined between the shells at the top of the cartridge 10. The inner sides of the shells are formed with inwardly projecting ribs 37 which are adapted to be received in elongated grooves 38 formed in the outer sides of the tongue 36. Each groove is defined in part by the upper side of a lower rib 39 on the web. The ribs 37 and the grooves 39 coact to define a track which allows the door 30 to be slid laterally of the cartridge 10 between its closed and open positions while captivating the tongue 36 from being pulled upwardly out of the shells 15 and 16.

To further support the door 30 for sliding and to enable the actuator arm of the disk drive to open the door, an arm 40 is molded integrally with and projects laterally from one end of the web 35. The upper side of the free end of the arm 40 is formed with a transverse tab 41 adapted to be engaged by the actuator arm. A lower portion of the arm 40 projects into the channel 25 and its free end is formed with lower flanges 42 (FIG. 3) which ride along the lower sides of ribs 43 molded integrally with and projecting inwardly from the inner sides of the shells 15 and 16.

The cartridge 10 is completed by a torsion spring 45 (FIG. 5) which normally holds the door 30 in its closed position and which returns the door to that position when permitted by the actuator arm of the disk drive. The spring is located between the shells 15 and 16 and includes one end tang 46 which is retained within a slot 47 in the shell 16. A slot 48 (FIG. 4) opens out of the bottom and one end portion of the tongue 36 to accommodate the other end tang 49 of the spring 45. The end tang 49 is formed with a right-angled finger 50 adapted to be received in a slot 51 formed in one side of the tongue and communicating with the slot 48, the slot 51 also opening out of the aforementioned end portion of the tongue. When the door 30 is opened, the spring 45 is loaded as shown in FIG. 9. Upon release of the tab 41 by the actuator arm, the spring relaxes as shown in FIG. 8 and returns the door to its closed position.

Because the shutters 31 and 32 are molded integrally with one another, the single-piece door 30 not only is less costly to manufacture but also lends itself to simple and relative high speed assembly with the shells 15 and 16. With the present cartridge 10, the shells and the door may be shipped as separate units by the cartridge manufacturer to the disk manufacturer. After a disk has been manufactured, high speed automated assembly equipment places the disk on the inner side of one shell, places the other shell in face-to-face relation with the first shell and the disk, and then connects the shells together by means of the screws 20. Thereafter, the unitary door 30 may be attached to the assembled shells. This is achieved simply by inserting the tongue 36 and the arm 40 downwardly into the channel 25. When the ribs 39 engage the ribs 37 and the flanges 42 engage the ribs 43, the upper end portions of the plastic shells flex outwardly to allow the ribs 39 to snap past the ribs 37 and to allow the flanges 42 to snap past the ribs 43. When the shells flex back inwardly to their normal positions, the ribs. 37 enter the grooves 38 while the ribs 43 move into overlying relation with the flanges 42. As a result, the door is mounted for lateral sliding relative to the shells but, at the same time, is captivated against separation from the shells by virtue of an interference fit. The slots 48 and 51 in the tongue 36 permit the tang 49 and the finger 50 of the spring 45 to couple to the tongue as an incident to attaching the doors to the shells.

By virtue of the assembly procedure explained above, the manufacturer of the cartridge components simply requires injection molding equipment and does not require any assembly equipment since the assembly of the components may be achieved at the same location where the disk 11 is placed in the cartridge 10. Moreover, the disk manufacturer requires less sophisticated assembly equipment since the door 30 may be attached to the shells 15 and 16 as a unit and at a different station from that at which the disk and the shells are assembled.

I claim:

1. A method of assembling a cartridge and a data information disk, said method comprising the steps of:

(A) providing (a) a data information disk, (b) a pair of shells made of resiliently yieldable plastic and each having inner and outer sides, having peripheral edges and having an access aperture, and (c) a one-piece integrally formed plastic door having first and second spaced and generally parallel shutters, a web molded integrally with and joining the ends of said shutters, and a tongue molded integrally with said web and located between said shutters;

(B) placing said disk on the inner side of one of said shells;

(C) placing the inner side of the other shell in face-to-face relation with said disk and said one shell;

(D) connecting said shells together in a manner captivating the disk in the shells while leaving a channel between the shells along one peripheral edge of the shells; and (E) inserting said tongue into said channel such that said tongue flexes said shells outwardly to allow said tongue to engage said inner sides of said shells with snap action for assembling said door to said shells with said web spanning said shells and with said shutters located adjacent the outer sides of said shells and movable along said outer sides between closed and open positions relative to said access apertures.

* * * * *